United States Patent [19]
Strohm

[11] Patent Number: 5,451,825
[45] Date of Patent: Sep. 19, 1995

[54] VOLTAGE HOMOPOLAR MACHINE

[75] Inventor: Bryan W. Strohm, Indianapolis, Ind.

[73] Assignee: Strohm Systems, Inc., Indianapolis, Ind.

[21] Appl. No.: 179,438

[22] Filed: Jan. 10, 1994

[51] Int. Cl.$^6$ .................................... H02K 31/00
[52] U.S. Cl. .................................... 310/178; 310/71; 310/156; 310/268
[58] Field of Search ............... 310/178, 261, 219, 45, 310/102 A, 248, 268, 71, 156, 217; 318/253; 322/48

[56] References Cited

U.S. PATENT DOCUMENTS

| | | | |
|---|---|---|---|
| 3,185,877 | 5/1965 | Sears | 310/178 |
| 3,436,581 | 4/1969 | Van Donselaar | 310/268 |
| 3,465,187 | 9/1969 | Breaux | 310/178 |
| 3,529,191 | 9/1970 | Henry-Baudot | 310/178 |
| 3,616,761 | 11/1971 | Valls | 310/178 |
| 3,699,370 | 10/1972 | Caldwell | 310/178 |
| 3,705,995 | 12/1972 | Chabrerie et al. | 310/178 |
| 3,784,853 | 1/1974 | Wangsness | 310/178 |
| 3,832,581 | 8/1974 | Hoffmann | 310/178 |
| 3,882,366 | 5/1975 | Clunis | 318/326 |
| 4,097,758 | 6/1978 | Jenkins | 310/178 |
| 4,208,600 | 6/1980 | Hatch | 310/178 |
| 4,691,133 | 9/1987 | Mongeau | 310/178 |
| 4,935,650 | 6/1990 | Hannan, II | 310/178 |

OTHER PUBLICATIONS

PCT International Publication No. WO82/02126, Closed Path Homopolar Machine, Trombly et al, Publication Date 24 Jun. 1982.

Eagleton et al., The Radial Magnetic Field Homopolar Motor, Am. J. Phys., vol. 56, No. 9, Sep. 1988, pp. 858–859.

Crooks et al., One-Piece Faraday Generator: A Paradoxical Experiment From 1851, Am. J. Phys., vol. 46, No. 7, Jul. 1978, pp. 729–731.

Corson, Electromagnetic Induction in Moving Systems, Am. J. Phys., vol. 24, 1956, pp. 126–130.

Scanlon et al., Approaches to Electromagnetic Induction, Am. J. Phys., vol. 37, No. 7, Jul. 1969, pp. 698–708.

Scanlon et al., Comment on "One-Piece Faraday Generator: A Paradoxical Experiment From 1851", Am. J. Phys., vol. 47, No. 10, Oct. 1979, pp. 917–918.

Then, Experimental Study of the Motional Electromotive Force, Am. J. Phys., 1962, pp. 411–415.

Marinov, Very Easy Demonstration of the Violation of the Angular Momentum Conservation Law . . . , Modern Physics, vol. 2, No. 3, 1991, pp. 73–77.

Primary Examiner—R. Skudy
Attorney, Agent, or Firm—Baker & Daniels

[57] ABSTRACT

A homopolar machine for use as a motor or a generator. The machine includes an elongated shaft rotatable about a longitudinal axis, a barrier disposed about the shaft, and first and second electrically conductive, magnetic field inducing disks connected to and disposed about the shaft such that the barrier is sandwiched therebetween. The barrier is conductive of a magnetic field and electrically insulated from the disks. The disks are electrically interconnected and generate a magnetic field perpendicular to the barrier with the magnetic field of the first disk in opposition to the magnetic field of the second disk. The machine also includes first and second electrical contacts electrically connected to the centers of the disks. The conductive path defined by the disks includes first and second ends at the centers of the disks and substantially travels the radius of each of the disks such that when used as a generator i.e., when the shaft is rotated to cause the flow of electricity between the first and second ends of the conductive path, the voltage in each disk is essentially added together.

13 Claims, 8 Drawing Sheets

VOLTAGE HOMOPOLAR MACHINE

BACKGROUND OF THE INVENTION

1. Field of the Invention

The present invention relates to generators and motors, and, more particularly, to a co-rotating axial type homopolar generator/motor.

2. Description of the Related Art

Generally, when contemplating a simple generator or motor, a Faraday disk generator/motor often comes to mind. A Faraday generator comprises a circular conducting disk which is rotatable about its axis in the presence of an axial magnetic field. Electrical contacts contact the disk at various radial positions on the disk, such as the center of the disk and the radially outward edge of the disk. The Faraday generator is also sometimes referred to as a unipolar or homopolar generator as the magnetic field through which the conductive disk rotates is oriented in one direction. Placing electromagnetic theory aside for the moment, it is not uncommon for one to think of cutting a magnetic field with a conductor to result in the generation of electricity. In essence, "flux-cutting" is generalized as relative motion between the conductor and the source of the magnetic field. This relative motion is not, however, the only manner in which electrical current can be generated.

If the rotating conducting disk of the simple Faraday generator is replaced with an electrically conductive cylindrical magnet that supplies its own axially aligned magnetic field, the effect is identical. If the magnet is rotated about an axis parallel to the magnetic field and electrical contacts are placed at the axis of rotation and at the outer radius of the disk, an electric voltage is generated. This type of generator is often called a co-rotating homopolar or unipolar generator as the source of the magnetic field rotates with the conductor.

The theory and mathematics of co-rotating homopolar generators is explained in greater detail in two articles which are incorporated herein by reference: "One-piece Faraday generator: A paradoxical experiment from 1851", Crooks et al., American Journal of Physics, Vol. 46, No. 7, p. 729-731, July 1978; and "Electromagnetic Induction in Moving Systems", Corson, American Journal of Physics, Vol. 24, p. 126, 1956. As explained in Crooks et al., the co-rotating generator is not novel and is often classified as a paradox to Faraday's law. However, it is the simplification of the electromagnetic theory to the concept of "flux-cutting" that creates difficulty in comprehending the co-rotating homopolar generator.

In general, there are two types of homopolar generators and motors. The first type is the axial field type, such as the generator described above, wherein the magnetic field is axially oriented and the electric field is radially oriented. For a radial field homopolar generator or motor, the second type, the magnetic field is oriented radially and the electric potential is axially oriented. An example of a simple radial type homopolar motor is disclosed in "The radial magnetic field homopolar motor", Eagleton et al., American Journal of Physics, Vol. 56, No. 9; p. 858-859, September 1988. This radial motor is comprised of a stainless steel tube having a contrapolarized magnetic rod therein. The steel tube and the magnetic rod are supported by separate bearings so that they are able to rotate with respect to each other along the longitudinal axis of the apparatus. Two electrical contacts, which are spaced apart from each other, are operatively connected to the steel tube. By providing electrical current to the tube, the tube rotates, but the magnetic rod does not rotate. Of course, the same embodiment may be used as a generator. If the steel tube is caused to rotate, current will be generated through the conductors contacting the tube. If the magnet and the tube are rotated together, the generator is a co-rotating radial field homopolar generator.

The applicability of homopolar generators has, to a large extent, been limited. Inherently, homopolar generators generate an electrical potential having extremely high amperage. The voltage generated is a function of the speed of rotation of the conductor, the strength of the magnetic field and the radius of the conductor. Specifically, the voltage is proportional to $B \cdot W \cdot R^2$ where B is the magnetic field strength, W is the rotational velocity and R is the radius. To generate higher voltages, the conductor disk is rotated at higher rpms or the radius of the conductor is increased. In many instances, a high speed of rotation results in the generation of heat, such as through the electrical contacts, which must be contained to avoid deterioration of the machine and should be minimized to increase the machine's efficiency. Using a larger disk may result in a machine of bulk, weight and overall dimensions that is unacceptable for some applications.

An example of a simple axial field homopolar generator, a Faraday generator, is disclosed in U.S. Pat. No. 3,882,366. The homopolar generator is used to control the speed of a bi-directional motor as the voltage generated by the generator is indicative of the speed and direction of rotation of the motor. The generator of U.S. Pat. No. 3,882,366 comprises a conductor disk which uniformly intersects a magnetic field that is parallel to the disk's axis of rotation. Two pairs of brushes, one pair near the center of the disk and another pair near the radially outward edge of the disk, are provided for conduction of the electricity generated therethrough. The axial field homopolar generator of U.S. Pat. No. 3,882,366 is not a co-rotating homopolar generator as the conductor rotates relative to the source of the magnetic field.

Other examples of homopolar generators wherein the conductor rotates or moves but the magnetic field source does not rotate or move are disclosed in U.S. Pat. Nos. 3,529,191, 3,465,187, 4,097,958, 4,208,600, and 3,705,995. To address the problem of generation by a homopolar generator of a low voltage, high amperage output, the generator of U.S. Pat. No. 3,465,187 uses multiple disks, electrically connected to each other to have the effect of adding the voltages derived from each disk. Specifically, two disks are rotated in opposite directions on parallel axes which intersect the magnetic field. U.S. Pat. Nos. 4,097,758, 4,208,600 and 3,705,995 each disclose a radial type homopolar generator/motor having a plurality of stacked (in relation to the axis of rotation) conductor disks which are electrically connect in series to each other to result in a higher voltage signal than is created when one conductor disk is utilized.

U.S. Pat. No. 3,669,370 discloses two generators. In one embodiment, a conventional radial homopolar generator is presented which utilizes field windings for generating a magnetic field. The field windings are mounted about the generator's stationary stator. The conductive disk of the rotor rotates perpendicularly to the generated magnetic field. In a second embodiment, the field windings are mounted about the rotor and, therefore, the field windings (the source of the magnetic field) rotate with the rotor. This co-rotating homopolar generator uses liquid metal encased with the generator to provide electrical contact with the rotating disk of the rotor.

Liquid metals, such as mercury or a sodium potassium alloy; are often used as electrical contact brushes in homopolar generators in view of the heat and velocity of the rapidly rotating rotor. Secondarily, liquid metals may assist in cooling the machine. Special precautions must be taken, however, when using liquid metals. The liquid must be compatible with the composition of the materials which it contacts, must be a good wetting agent of high conductivity, be relatively inert, have low viscosity, and have a wide temperature range over which the material remains in a liquid state without deteriorating. In addition, a recirculation system is often utilized to continually cool the machine. Thus, the use of liquid metal adds undesirable expense to manufacturing costs and to the maintenance of the generator. It is preferable to utilize a contact mechanism which is less expensive than liquid metal and which does not require any such special precautions. Consequently, it is also desirable to provide a homopolar generator wherein heat generation is minimized, not only to eliminate the requirement for expensive contacts, but also to increase the efficiency of the generator by limiting energy lost to heat generation.

Another co-rotating homopolar generator is disclosed in WIPO International Publication No. WO 82/02126. The basic elements of this generator are a rotating disk conductor having co-rotating coaxial electromagnetic coils on either side of the disk. The current generated is picked up by brushes which contact the radially outward edge of the disk and the rotor shaft. To increase the efficiency of a homopolar generator by reducing the amount of energy lost to heat, the generator of this publication uses a low reluctance magnetic return path for the magnetic flux that passes through the disk conductor. To realize this benefit, a high permeability co-rotating enclosure and a high permeability, low resistance disk is utilized. In addition, brushes of special construction are employed.

The use of electromagnetic coils to generate the magnetic field necessitates that special precautions, such as those disclosed in WIPO International Publication No. WO 82/02126, be taken to increase efficiency of the generator as the coils inherently generate heat thereby reducing the generator's efficiency. It is therefore desired to develop a homopolar generator which does not utilize electromagnetic coils to avoid the reduction in generator efficiency resulting therefrom, and also to provide a generator which amplifies the voltage generated to an improved (higher) level when compared to other homopolar generators.

In addition to the specific concerns related to homopolar generators, it is also desirable to provide a generator which may be utilized for a variety of applications. Not only must the signal generated be of a sufficient voltage and amperage for the application, the generator itself must meet the physical restraints, such as size and weight, for that application. It is desired to provide a homopolar generator whose design may be utilized to generate a wide range of voltages and which may do so while remaining within the physical restraints set forth by the particular application in which the generator is to be utilized.

It is also desired that the configurable generator be comprised of off-the-shelf components to thereby minimize manufacturing, repair and maintenance costs of the generator.

SUMMARY OF THE INVENTION

The present invention provides a homopolar machine that may be utilized as either a motor or a generator. When used as a generator, combining the voltage of a plurality of electrically conductive, magnetic field-inducing disks results in a higher voltage than in prior art co-rotating homopolar generators.

The invention comprises, in one form thereof, a homopolar machine comprising a shaft, a barrier means, first and second disks, means for electrically interconnecting the first and second disks, and first and second electrical contacts. The shaft has a longitudinal axis about which the shaft is rotatable. The barrier means is conductive of a magnetic field. The barrier means is disposed about the shaft substantially perpendicular to the shaft's longitudinal axis. The first and second disks are connected to and disposed about the shaft adjacent the barrier means such that the barrier means is sandwiched therebetween. The disks are electrically conductive, electrically insulated from the shaft and from the barrier means, and generate a magnetic field perpendicular to the barrier means. The magnetic field of the first disk is in opposition to the magnetic field of the second disk.

In one embodiment thereof, the machine further comprises a means for rotating the shaft and a conducting means connected between the first and second contact means. Rotation of the shaft by the rotating means results in rotation of the disks connected thereto and in the generation of electricity through the conducting means. In this embodiment, the machine operates as a generator.

In another embodiment thereof, the machine also includes a means for generating electricity which is connected to the first and second contact means such that the provision of electricity to the first and second contact means causes the shaft and disks to rotate about the shafts longitudinal axis. In this manner, the machine operates as a motor.

The disks of the present invention, in one embodiment, may be comprised of an electrically conductive material having a magnetic field-inducing coating thereon. In another embodiment, the disks are comprised of a conductive plate and a magnetic plate. The conductive plate has first and second opposing surfaces with the first opposing surface facing the barrier means. The magnetic plate is positioned adjacent the second opposing surface of the conductive plate and may be comprised of a plastic disk having permanent magnets mounted thereon.

In one form thereof, the first and second disks are electrically connected at the radially outward edge of the disks, as by electrically conductive rings, for example, and the first and second contact means are disposed at the center of the disks. The conductive path between the first and second contact means thus substantially traverses the radius of both disks. When employed as a generator, the voltage of each disk is added together. By placing the contact means near the center of the disks, conventional, inexpensive brushes may be employed as the contact means.

The invention comprises, another form thereof, a homopolar machine employing a plurality of electrically conductive, magnetic field inducing disks as previously described. The disks are electrically connected to each other to form a conductive path. The conductive path has first and second ends and substantially traverses the radius of each disk therebetween with the first and second ends of the conductive path disposed near the center of the disks of the pair of disks disposed furthest from the barrier means. When used as a generator, i.e., when the shaft and disks are caused to co-rotate, the voltage of each disk is added together to result in a higher voltage than achieved with prior art homopolar generators.

An advantage of the present invention is the provision of a homopolar generator which is capable of generating electricity having a higher voltage than that generated by homopolar generators of the prior art.

Another advantage is the provision of a high voltage homopolar generator which limits the amount of heat generated to thereby result in an energy efficient generator.

Yet another advantage of the present invention is the provision of a homopolar generator/motor which is of manageable size to be utilized for a myriad of applications.

A yet further advantage is the provision of a homopolar generator/motor that is comprised of off-the-shelf components to thereby limit manufacturing costs.

Still another advantage of the present invention is the provision of a homopolar generator/motor that utilizes low cost, low maintenance contacts.

A still further advantage is the provision of a configurable homopolar generator, i.e., the overall design of the generator may be used to satisfy various applications by configuring the machine to generate specific levels of voltage and current required for an application.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate one preferred embodiment of the invention, in one form, and such exemplifications are not to be construed as limiting the scope of the invention in any manner.

DETAILED DESCRIPTION

Figure 1:
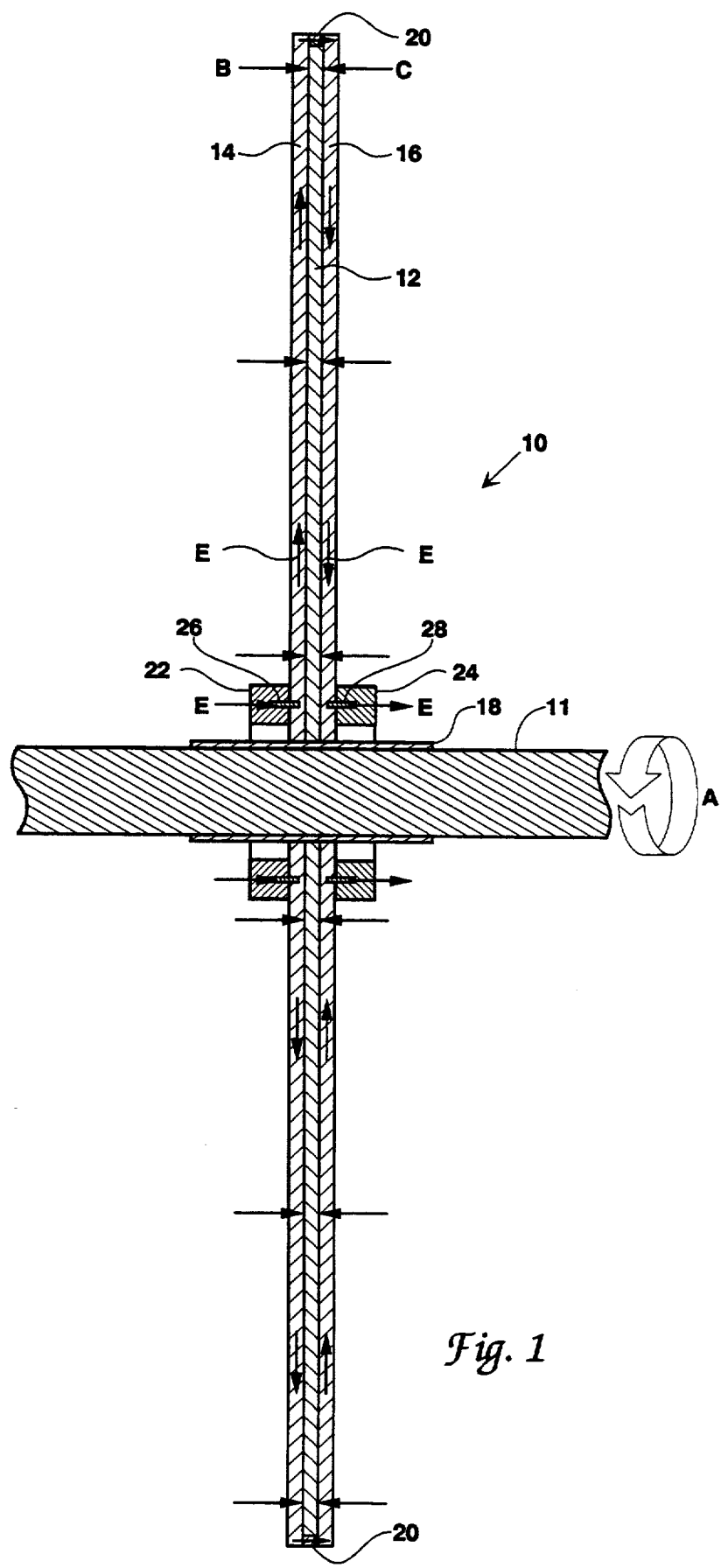
FIG. 1 is a cross-sectional view of one embodiment of the homopolar machine of the present invention.

Referring now to the drawings and particularly to FIG. 1, there is shown is a cross-sectional view of one embodiment of the homopolar machine of the present invention. Homopolar machine 10, which may be employed as either a generator or a motor as is further described herein, includes shaft 11 having a longitudinal axis. In this embodiment, shaft 11 is comprised of steel, a magnetically conductive material. Shaft 11 is rotatable about its longitudinal axis as indicated by the direction arrow A. Disposed about longitudinal shaft 11 and substantially perpendicular to the longitudinal axis of shaft 11 is barrier 12. Barrier 12 is comprised of a material, such as a combination of steel and plastic, which is conductive of a magnetic field as well as electrically insulated from the rest of the machine. In this embodiment, barrier 12 is connected to shaft 11 such that when shaft 11 rotates, barrier 12 also rotates. However, barrier 12 need not be connected to shaft 11 so long as barrier 12 serves the function of an electric field and magnetic field barrier.

Machine 10 also includes first and second disks 14 and 16, respectively. First and second disks 14 and 16 are each electrically conductive and each induces a magnetic field substantially perpendicular to barrier 12. Specifically, first disk 14 generates a magnetic field in direction B and second disk 16 induces a magnetic field in direction C. Thus, the magnetic field induced by first disk 14 is substantially in opposition to the magnetic field induced by second disk 16. First and second disks 14 and 16 may comprise, for example, conductive disks such as copper, aluminum or steel disks having magnetic coatings thereon. Such a coating may be painted or pressed thereon, for example. First and second disks 14 and 16 are electrically insulated from shaft 11 via insulating sheath 18. Insulating sheath 18 may comprise, for example, plastic. First and second disks 14 and 16 are centered on and are connected to shaft 11 such that when shaft 11 rotates, first and second disks 14 and 16 rotate in concert therewith. Similarly, should disks 14 and 16 be caused to rotate, shaft 11 also rotates therewith. First and second disks 14 and 16 are also electrically insulated from barrier 12. Such insulation may be achieved if disks 14 and 16 are comprised of plastic having a magnetic coating thereon, or, alternately, if an electrically insulating material is disposed between barrier 12 and each of disks 14 and 16.

First and second disks 14 and 16 are electrically connected to each other via electrically conductive ring 20 disposed about the radially outward edge of first and second disk 14 and 16. In this embodiment, ring 20 is comprised of aluminum. Thus, first and second disks 14 and 16 define a conductive path having ends at the respective centers of first and second disks 14 and 16 and which substantially traverses the radii of first and second disks 14 and 16. To make electrical contact with first and second disks 14 and 16, first and second contacts 22 and 24, respectively, are positioned at the center of first and second disks 14 and 16. In this embodiment, first contact 22 is electrically connected to first disk 14 via first connecting pins 26 which are affixed to first disk 14 and second contact 24 is electrically connected to second disk 16 via second pins 28 which are affixed to second disk 16. The flow of electricity through first and second disks 14 and 16, assuming that shaft 11 rotates in direction A as illustrated, is illustrated by direction arrows E.

Figure 2:
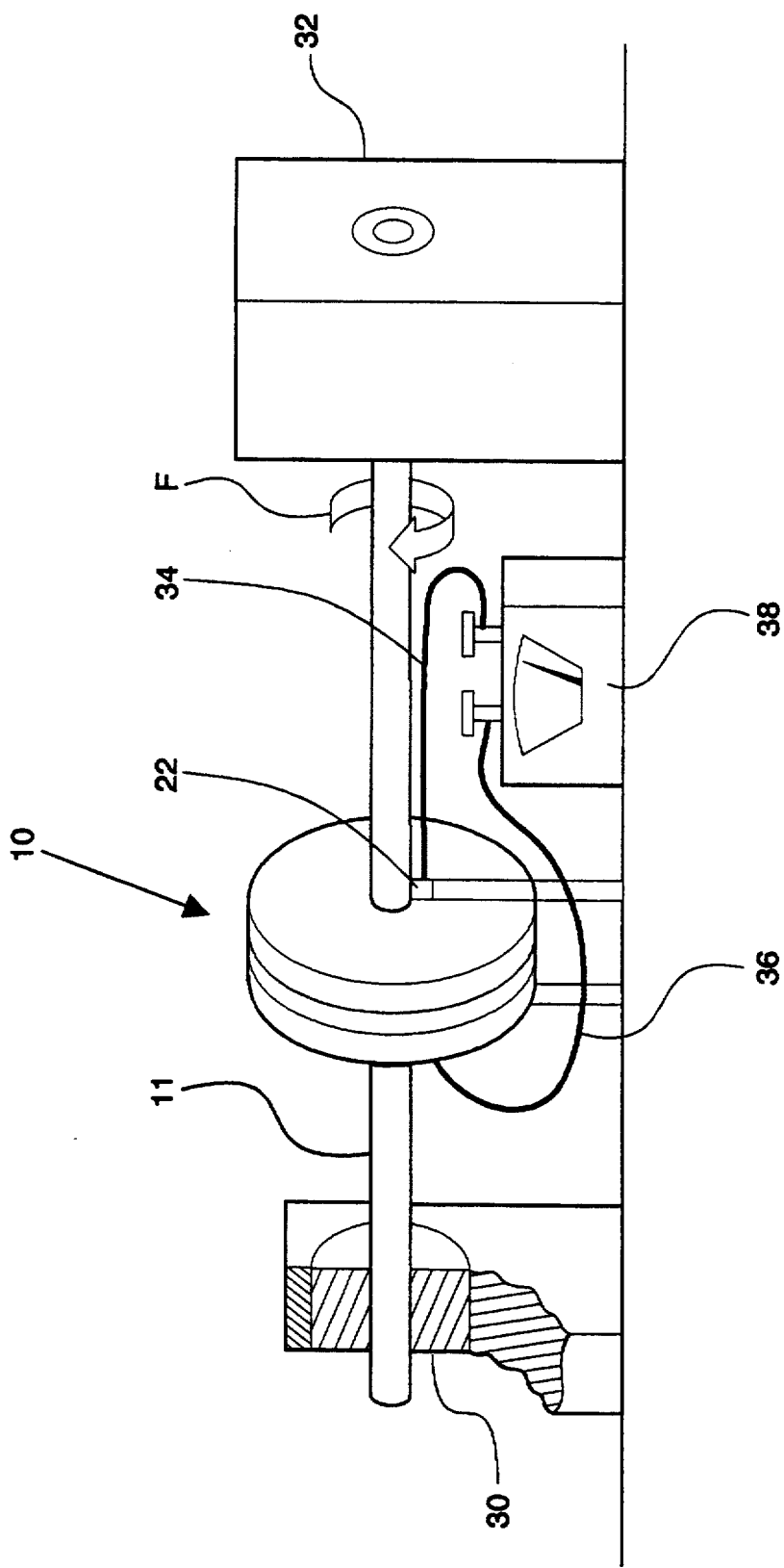
FIG. 2 is a diagrammatic perspective view of the machine of the embodiment of FIG. 1 employed as a generator.
Figure 3:
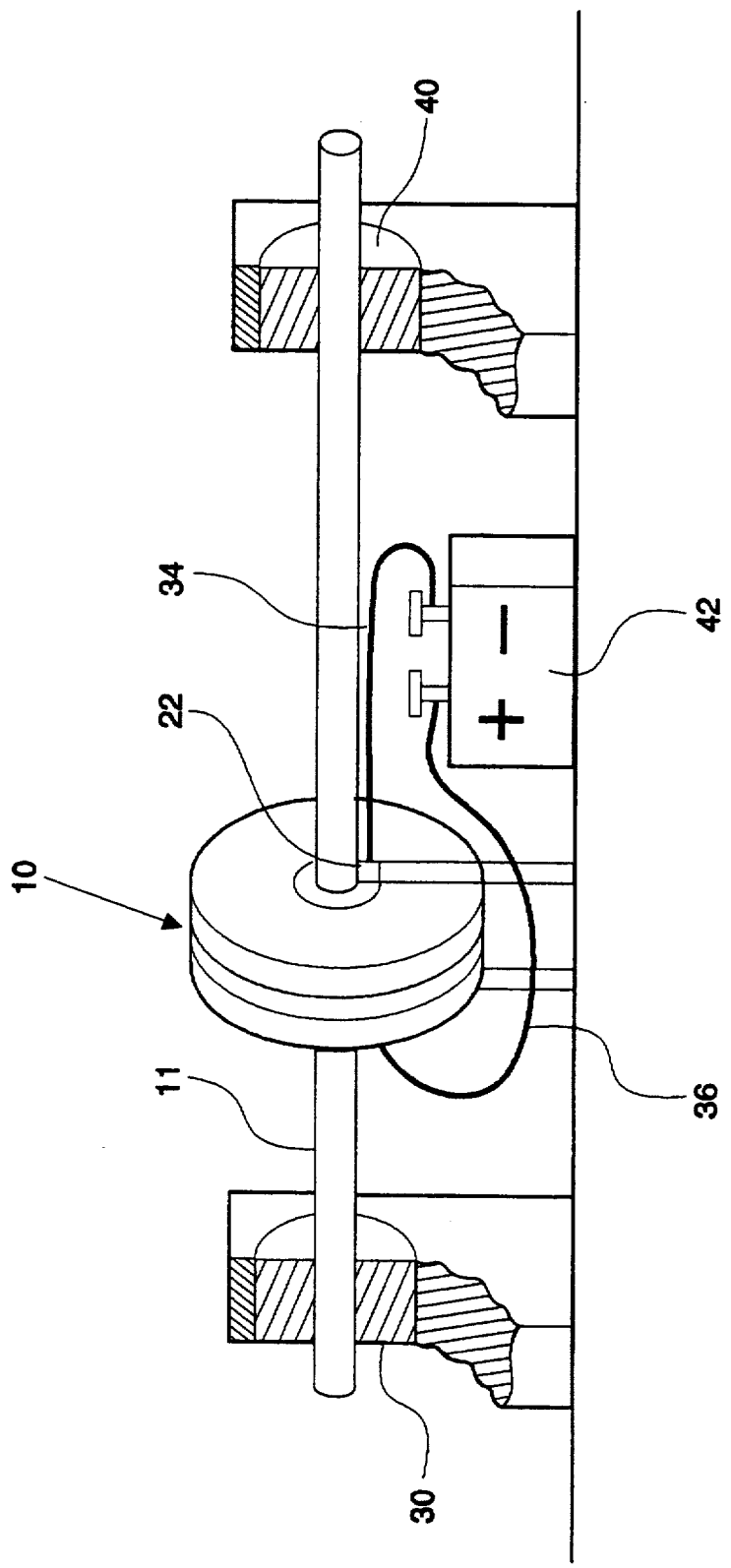
FIG. 3 is a diagrammatic prospective view of the machine of the embodiment of FIG. 1 employed as a motor.

The components of machine 10 are better understood by examining machine 10 when it is used as a generator and as a motor. Accordingly, FIGS. 2 and 3 show the machine of the embodiment of the homopolar machine of FIG. 1 as employed as a generator and as a motor, respectively. Referring first to FIG. 2, machine 10 is utilized as a generator. In this embodiment, shaft 11 is supported at one of its ends by bearings 30 and at its other end by motor 32. Motor 32 is connected to shaft 11 such that upon provision of power to motor 32, shaft 11 is caused to rotate in direction F as illustrated. Conducting means, namely first and second wires 34 and 36, are connected to first and second contacts 22 and 24, respectively. In this embodiment, first and second wires 34 and 36 are connected to voltmeter 38 for measurement of potential between first and second contacts 22 and 24. During operation, activation of motor 32 causes shaft 11 to rotate in direction F. First and second disks 14 and 16 and barrier 12 are also caused to rotate with shaft 11 in direction F. The rotation of first and second disks 14 and 16 results in the generation of a potential across the conductive path defined by first and second disks 14 and 16 as is evident by the illustrated reading on volt meter 38.

It will be appreciated by those of skill in the art that machine 10 of the present invention is comprised of few components, rendering the machine as relatively inexpensive to manufacture. In addition, first and second contacts 22 and 24 are located near the center of first and second disks 14 and 16 respectively. By engaging first and second disks 14 and 16 at the point of smallest linear velocity, contacts 22 and 24 may be comprised of inexpensive, off-the-shelf contacts such as copper impregnated carbon brushes.

It will also be appreciated that the configuration illustrated in FIG. 1 results in an output voltage comprised of the voltage generated by first disk 14 added to the voltage of the potential generated by second disk 16. Thus, the resulting voltage is higher than prior art co-rotating homopolar generators wherein a single disk is employed.

It will be further appreciated that the generator of the present invention is a co-rotating homopolar generator. This means that there are few parts moving with respect to each other. Therefore, no special cooling mechanisms are required and less energy is lost to heat than might be experienced in a conventional homopolar generator wherein the conductive and magnetic materials move with respect to each other.

FIG. 3 shows the homopolar machine of FIG. 1 employed as a motor. In this configuration, shaft 11 of homopolar machine 10 is supported at one of its ends by bearings 30 and at its other end by bearings 40. First and second wires 34 and 36 are connected to an electrical power source, namely, battery 42, which is capable of generating electrical current through first and second wires 34 and 36. During operation, electrical potential is provided across first and second contacts 22 and 24 by first and second wires 34 and 36 via battery 42. Electrical current flows through first and second disks 14 and 16. The flow of the current together with the presence of the magnetic field of first and second disks 14 and 16 results in the rotation of disks 14 and 16. Consequently, shaft 11 is also caused to rotate.

In the embodiments of FIGS. 1-3, the magnetic fields induced by first and second disks 14 and 16 are substantially perpendicular to barrier 12 and, more specifically, the magnetic fields are directed toward barrier 12. It will be appreciated by those of skill in the art that the magnetic fields may be directed in opposite directions to directions B and C shown in FIG. 1. It is only necessary that the magnetic fields induced by first and second disks 14 and 16 be substantially in opposition to each other in addition to each magnetic field being substantially perpendicular to barrier 12.

Figure 4:
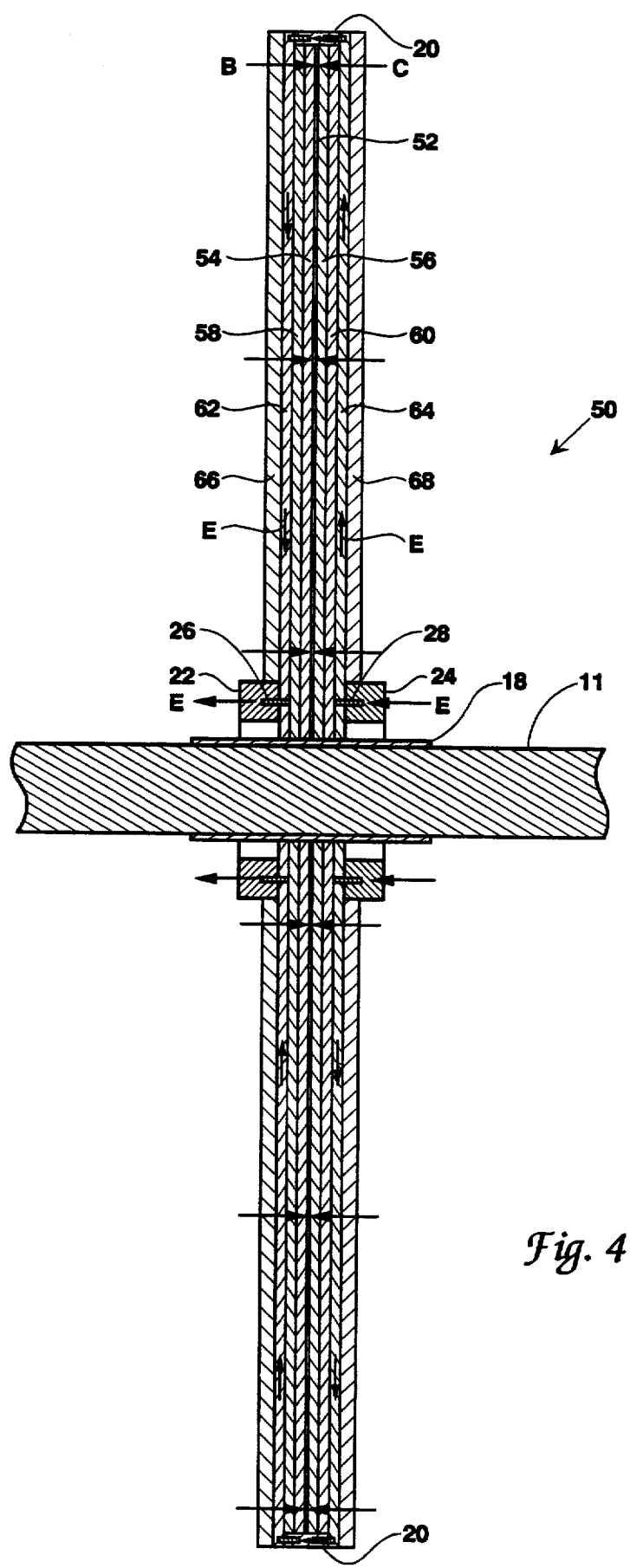
FIG. 4 is a cross-sectional view of a second embodiment of the homopolar machine of the present invention wherein two sets of magnetic disks having a conductive disk sandwiched therebetween are disposed on either side of the barrier disk.

FIG. 4 shows a cross-sectional view of a second embodiment of the homopolar machine of the present invention wherein two sets of magnetic disks having a conductive disk sandwiched therebetween are disposed on either side of the barrier disk. Homopolar machine 50 of FIG. 4 comprises many of the same components of homopolar generator 10 illustrated in FIG. 1. In this embodiment, the barrier means is comprised of steel plate 52 sandwiched between first and second plastic disks 54 and 56, respectively. By employing a barrier constructed of relatively light material such that if the barrier rotates with shaft 11 and is used in the generator configuration described above, the energy required to cause the barrier means to rotate is less than it would be if a heavier barrier material were employed.

In this embodiment, separate disks are used for inducing a magnetic field and for conducting electrical current. Specifically, disposed on either side of first and second plastic disks 54 and 56 of the barrier means are first and second magnetic disks 58 and 60 for inducing magnetic fields in directions B and C, respectively. Disposed on either side of first and second magnetic disks 58 and 60 are first and second conductive disks 62 and 64, respectively. Disposed adjacent first and second conductive disks 62 and 64 are third and fourth magnetic disks 66 and 68, respectively, each generating a magnetic field in directions B and C, respectively.

Figure 5:
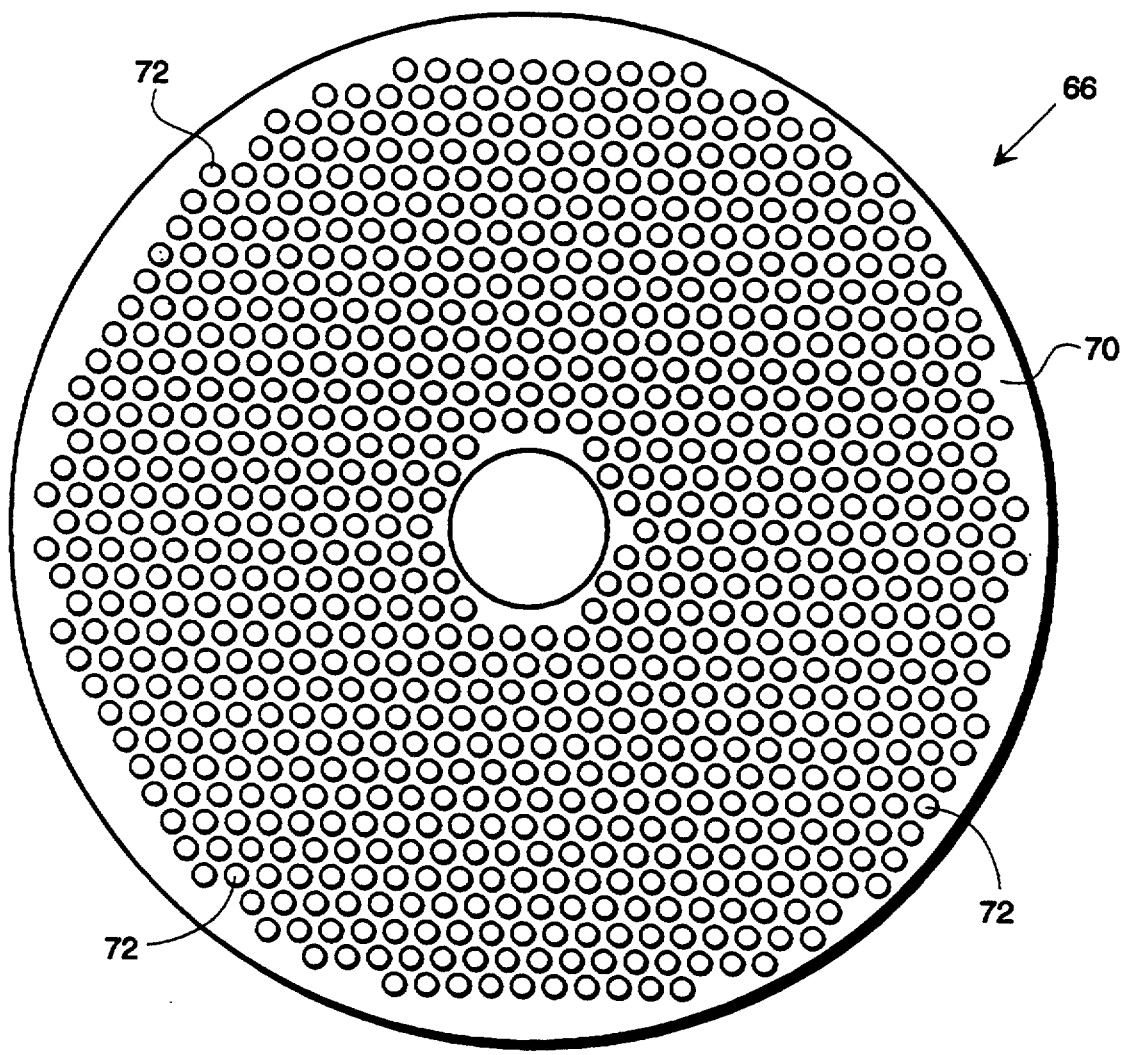
FIG. 5 is a top view of one embodiment of a magnetic disk of the homopolar machine of the present invention.

Referring now to FIG. 5 there is shown a top view of one embodiment of a magnetic disk of the homopolar machine of the present invention. In this illustration, third magnetic disk 66 is illustrated; however, all magnetic disks 58, 60, 66 and 68 are of the same construction in the embodiment of FIG. 4. Third magnetic disk 66 comprises plastic disk 70 having an array of permanent magnets 72 affixed to or embedded therein. The magnetic field induced by each permanent magnet 72 is oriented in the respective direction illustrated in FIG. 4. The magnetic field induced by the magnetic disk of FIG. 5 is not strictly a uniform field. A perfectly uniform magnetic field is not essential to the invention.

It will be appreciated by those of skill in the art that no electromagnetic coils are utilized in this embodiment. This is advantageous in that permanent magnets do not generate heat as do electromagnetic coils. Thus, homopolar machine 50 when employed as a generator is more efficient, as the magnetic field inducing mechanism does not generate heat—a loss of energy. In addition, the absence of such heat eliminates the need for special precautions to be taken to contain that heat so that it is not destructive of the machine itself or any components thereof.

It will be further appreciated by those of skill in the art that homopolar generator 50 illustrated in FIG. 4 need not include first and second magnetic disk 58 and 60. Specifically, a homopolar machine may be comprised of a barrier means, first and second conductive disks 62 and 64 and third and fourth magnetic disks 66 and 68. The advantage gained in employing first and second magnetic disks 58 and 60 is increased magnetic field strength. As the voltage generated by the machine is dependent upon the strength of the magnetic field, it is desirable to increase that magnetic field. Increasing the magnetic field strength is easily accomplished with the implementation of first and second magnetic disks 58 and 60 adjacent the barrier means.

Figure 6:
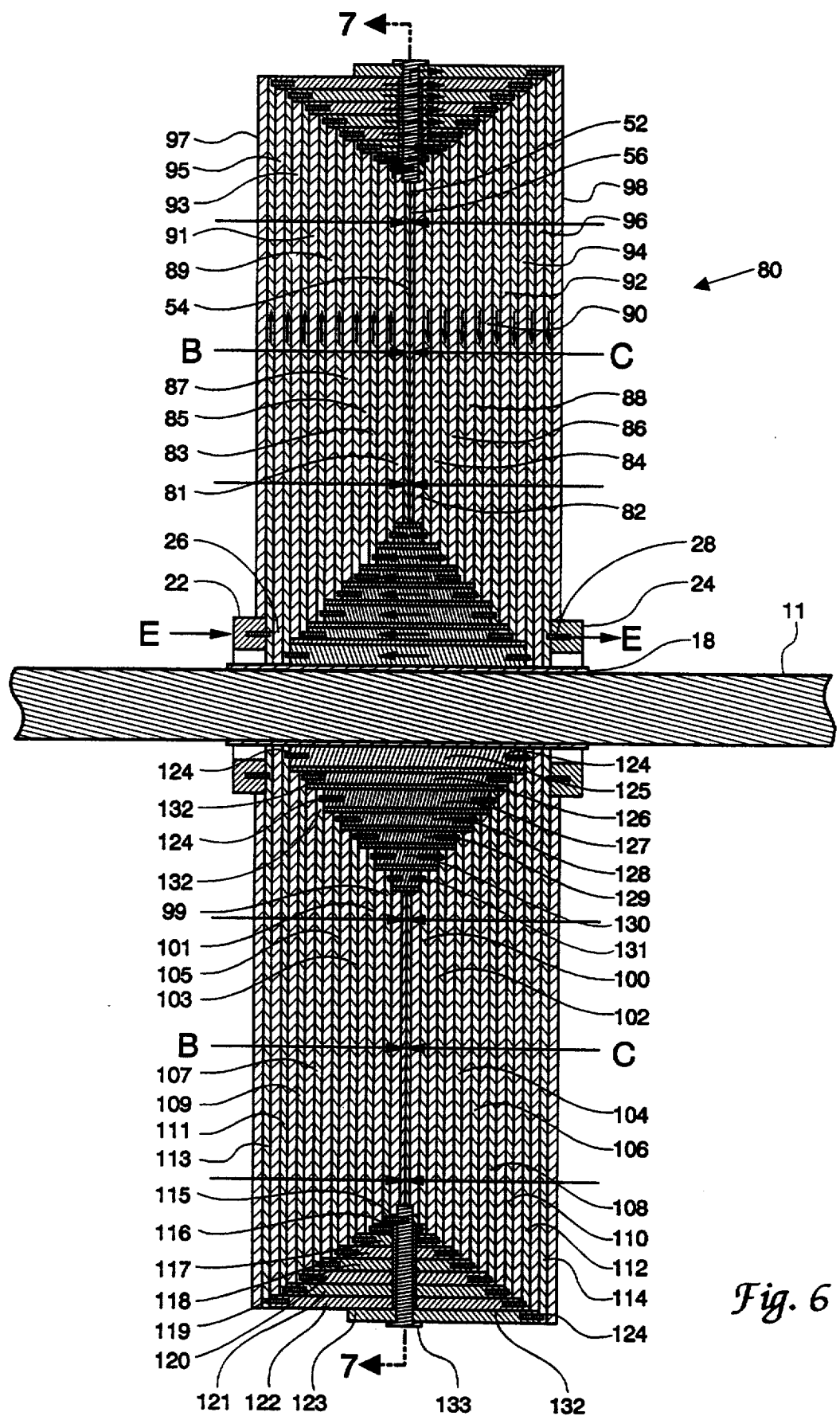
FIG. 6 is a cross-sectional view of a third embodiment of the homopolar machine of the present invention in which several alternating magnetic and conductive disks are utilized.

FIG. 6 shows a cross-sectional view of a third embodiment of the homopolar machine of the present invention in which several alternating magnetic and conductive disks are utilized. In this embodiment, eight (8) pairs of disks, each disk comprising a conductive plate and a magnetic field-inducing plate, are centered on and connected to the shaft on opposing sides of the barrier means. The barrier means (steel disk 52 sandwiched between first and second plastic disks 54 and 56) is sandwiched between first and second magnetic disks 81 and 82. As previously stated, first and second magnetic disks 81 and 82 are not essential to the invention but assist in strengthening the magnetic field to result in higher voltages when homopolar machine 80 is used as a generator.

Figure 7:
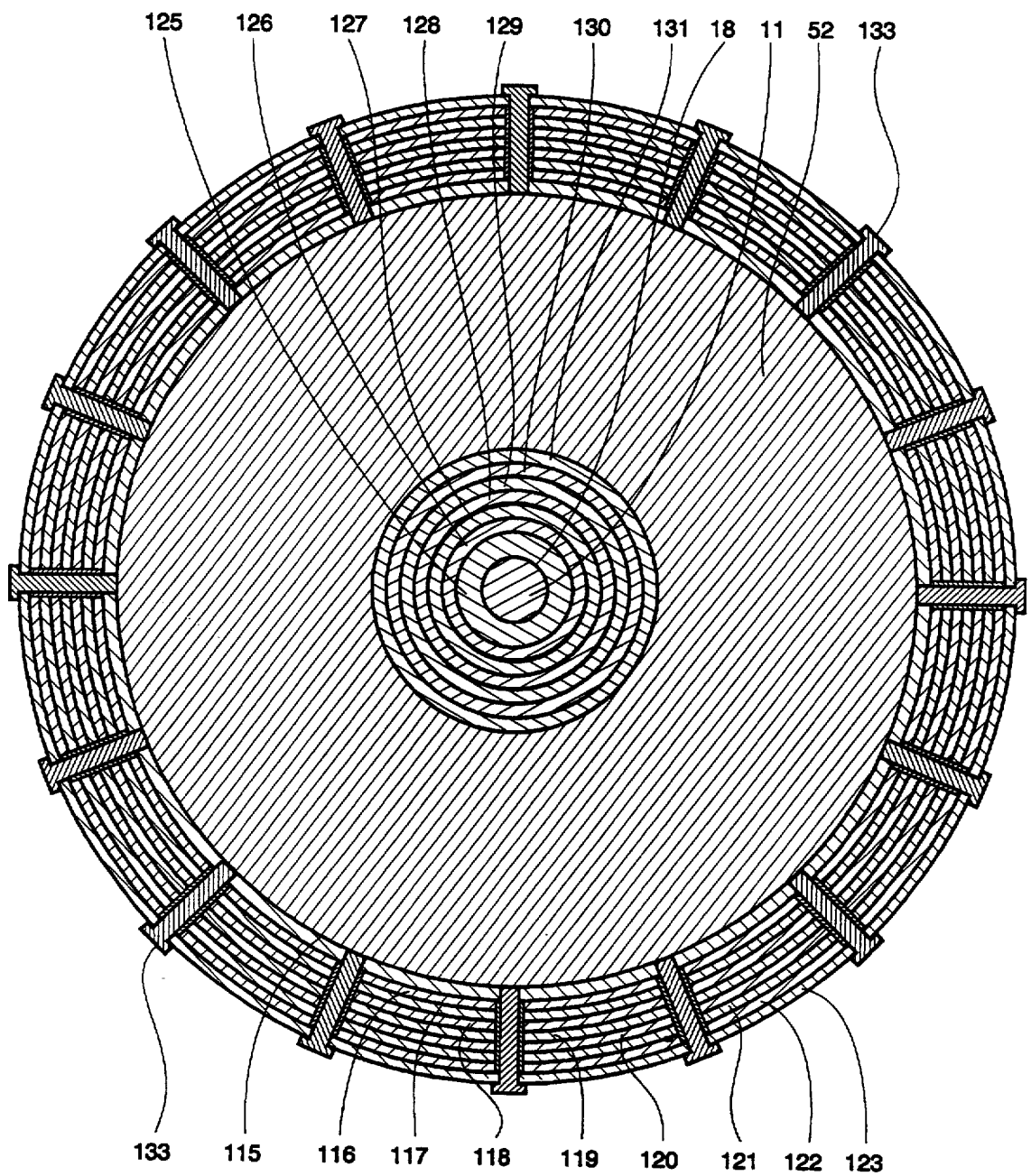
FIG. 7 is a cross-sectional view of the embodiment of FIG. 6 at line 7—7.

Homopolar generator 80 also includes first through sixteenth conductive plates 99–114 and first through sixteenth magnetic plates 83–98. Conductive plates 99–114 are electrically connected to each other via first through ninth conductive rings 115–123 and via first through seventh conductive sleeves 125–131 as is explained in greater detail herein. In general, conductive rings 115–123 are attached to a conductive plate at the radially outward edge of the magnetic plate via pins 124. Similarly, conduction sleeves 125–131 are attached to a conductive plate at the center of the conductive plate by pins 124. Conductive rings 115–123 are also held in place by conductive fasteners 133 extending through and electrically insulated from conductive rings 116–122, and contacting first conductive ring 115 and ninth conductive ring 123. Also, conductive rings 115–123 and conductive sleeves 125–131 are insulated from each other via insulators 132. To provide clarification of the construction of homopolar machine 80, FIG. 7 shows a cross-sectional view of the embodiment of FIG. 6 at line 7—7.

As previously stated, homopolar machine 80 comprises eight (8) pairs of conductive, magnetic field inducing disks which sandwich the barrier means. The first disk pair is comprised of two disks—one disk including first conductive plate 99 and first magnetic plate 83 and the other disk including second conductive plate 100 and second magnetic plate 84. The second disk pair comprises one disk including third conductive plate 101 and third magnetic plate 85 and another disk including fourth conductive plate 102 and fourth magnetic plate 86. The final or eighth pair includes a disk comprising fifteenth conductive plate 113 and fifteenth magnetic plate 97 and another disk comprising sixteenth conductive plate 114 and sixteenth magnetic plate 98. Contacts 22 and 24 are connected to the outermost, eighth, pair of disks. Specifically, via pin 26, first contact 22 is electrically connected to fifteenth conductive plate 113 and second contact 24 is electrically connected via pin 28 to sixteenth conductive plate 114.

Magnetic plates 83–98 and first and second magnetic disks 81 and 82 in this embodiment are constructed as illustrated in FIG. 5. By mounting permanent magnets 72 on plastic disk 70, each conductive plate 99–114 of the embodiment of FIG. 6 is electrically insulated from each other by plastic disk 70 of each magnetic plate 83–98.

In this embodiment, each conductive plate 99–114 is electrically connected to the next successive conductive plate via conductive rings 115–123 and conductive sleeves 125–131 as illustrated. In this manner, a single conductive path having first and second ends at contacts 22 and 24 is formed. The conductive path is spiral when viewed in FIG. 6. Also, the conductive path substantially traverses the radii of each conductive plate 99–114. By so doing, when used as a generator, the voltage resulting is significantly greater than when a single electrically conductive, magnetic field inducing disk is employed. For example, if the overall radius of the device is 10 inches, theoretically, at 5,000 rpm a 100 volt signal may result when using homopolar generator 80. To accomplish the same output voltage with a homopolar generator comprising a single disk, the radius of the disk will be required to be large (on the order of 40 inches) or if having a radius of 20 inches, would need to be rotated a high rpm (on the order of 20,000 rpm). Thus, the homopolar generator of the present invention is capable of generating higher voltages while rotating at a reasonable rpm and while being of a size that is useful for a variety of applications.

It will be appreciated by those of skill in the art that various homopolar machines can be constructed under the principles outlined herein. The size of the disks and the number of disks can be modified according to the desired voltage output of the generator. This configurability permits the design to be utilized in a myriad of applications.

Figure 8:
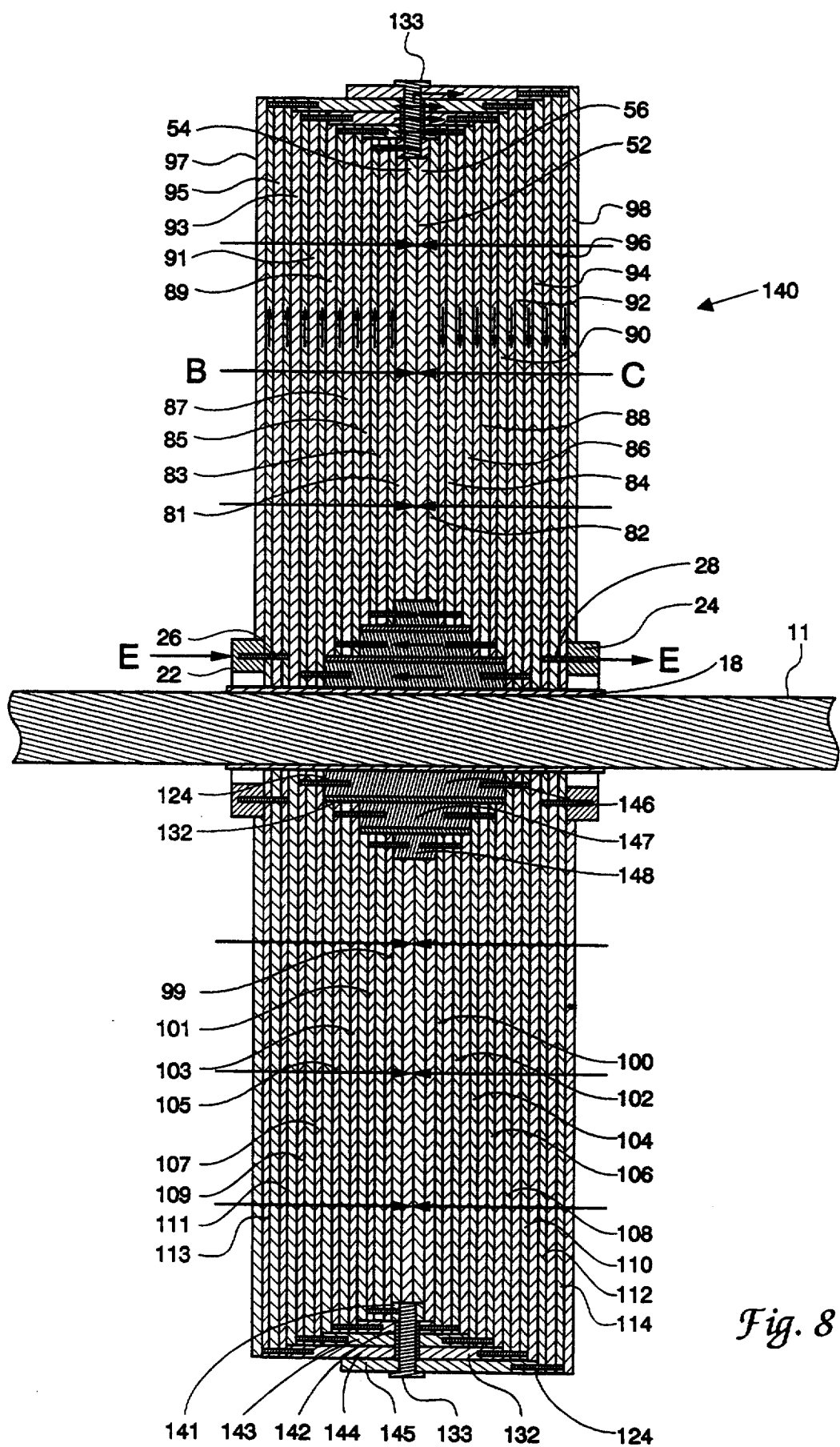
FIG. 8 is a cross-sectional view of a fourth embodiment of the homopolar machine of the present invention which utilizes several alternating magnetic and conductive disks and wherein the conductive disks are electrically interconnected.

Referring now to FIG. 8 there is shown a cross-sectional view of a fourth embodiment of the homopolar machine of the present invention which utilizes several alternating magnetic and conductive disks wherein the conductive disks are electrically interconnected. Unlike the embodiment of FIG. 6, sets of conductive plates are electrically connected to each other in parallel and in series rather than electrically connecting each successive conductive plate in series. Conductive plates 99–114 are electrically joined by conductive sleeves 146–148 and conductive rings 141–145 as shown. First and third conductive plates 99 and 101 are electrically connected via first conductive ring 141 and first conductive sleeve 148. First conductive sleeve 148 also connects first and third conductive plates 99 and 101 to second and fourth conductive plates 100 and 102. Second and fourth conductive plates 100 and 102 are electrically connected to fifth and sixth conductor plates 103 and 105, and so on.

Though sixteen magnetic and conductive plates are employed in the embodiment of FIG. 8, the voltage resulting is less than that of the embodiment of FIG. 6 as sets of conductor plates are combined to form a single conductive path. Thus, the voltage may be approximately one-half that resulting with the embodiment of the homopolar generator of FIG. 6. However, the amperage of the embodiment of FIG. 8 is likely to be greater than that of FIG. 6. Thus, it will be appreciated that the design of the homopolar generator may be configured to meet the voltage and amperage requirements of a particular application.

It will be appreciated by those of skill in the art that the effective magnetic field of the embodiments of FIGS. 4, 6 and 8 is amplified due to the stacking of multiple magnetic field inducing disks. Because electric potential generated, when the machine is used as a generator, is a function of the magnetic field strength, such stacking also assists in generating a higher electric potential. Also, although the embodiments of the homopolar machine of the present invention illustrated herein are open magnetic flux path systems, it will be appreciated that a closed flux path system may be created by encasing the disks in a magnetically conductive material, such as iron. By connecting such a casing to the barrier means, which is magnetically conductive, and to the magnetically conductive shaft, the flux path is closed at the inner and outer radii of the disks. Thus, the field strength of the magnetic field near the shaft and near the outer radius of the disks is further amplified in a closed flux path system.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A homopolar machine, comprising:
   an elongated shaft rotatable about a longitudinal axis;
   barrier means disposed about said shaft substantially perpendicularly to said longitudinal axis, said barrier means substantially conductive of a magnetic field;
   first and second disks each comprising an inner radial periphery and an outer radial periphery, wherein each said disk is electrically conductive and magnetic field-inducing, each said disk connected to said shaft to be rotatable therewith, wherein each said disk is disposed about said shaft adjacent said barrier means such that said barrier means is sandwiched between said disks, each said disk generating a magnetic field directed perpendicular to said barrier means, said magnetic field of said first disk in opposition with said magnetic field of said second disk, each said disk electrically insulated from said shaft and from said barrier means;
   means for electrically interconnecting said first and second disks at said outer radial peripheries of said disks, wherein said electrically interconnecting means spans said barrier means and is connected to said first and second disks to be rotatable therewith;
   first and second electrical contacts, said first contact electrically connected to said first disk proximate said first disk inner radial periphery and said second contact electrically connected to said second disk proximate said second disk inner radial periphery, whereby an electrical current may pass through said first electrical contact, radially outwardly through said first disk, through said electrically interconnecting means, radially inwardly through said second disk, and through said second electrical contact; and
   wherein each said disk comprises:
     a first conductive plate having first and second opposing surfaces, said first opposing surface facing said barrier means; and
     a first magnetic plate, said first magnetic plate disposed adjacent said second opposing surface.

2. A homopolar machine, comprising:
   an elongated shaft rotatable about a longitudinal axis;
   barrier means disposed about said shaft substantially perpendicularly to said longitudinal axis, said barrier means substantially conductive of a magnetic field;
   first and second conductive disks centered on and connected to said shaft to be rotatable therewith, said first and second conductive disks disposed about said barrier means such that said barrier means is sandwiched between said first and second conductive disks, both said first and second conductive disks electrically insulated from the shaft and from said barrier means;
   first and second magnetic disks centered on and connected to said shaft to be rotatable therewith, said first and second magnetic disks disposed about said first and second conductive disks, respectively, such that said barrier means and said first and second conductive disks are sandwiched between said first and second magnetic disks, both said first and second magnetic disks generating magnetic fields substantially perpendicular to said barrier means, said magnetic fields of said first and second magnetic disks in opposition to each other;
   means for electrically interconnecting said first and second conductive disks, wherein said electrically interconnecting means spans said barrier means and is connected to said first and second conductive disks to be rotatable therewith; and
   first and second contact means electrically connected to said first and second conductive disks, respectively.

3. The machine of claim 2, wherein said barrier means comprises a steel disk centered on the shaft.

4. The machine of claim 3, wherein said barrier means further comprises first and second plastic disks centered on said shaft and sandwiching said steel disk.

5. The machine of claim 2, wherein each said conductive disk is comprised of aluminum.

6. The machine of claim 2, wherein each said conductive disk is comprised of copper.

7. The machine of claim 2, wherein said conductive disks are comprised of steel.

8. The machine of claim 2, wherein each magnetic disk is comprised of permanent magnets.

9. The machine of claim 2, wherein said electrically interconnecting means is comprised of an electrically conductive ring connected to the radially outward edges of said first and second conductive disks.

10. The machine of claim 9, wherein said electrically conductive ring is comprised of aluminum.

11. The machine of claim 2, wherein said electrically interconnected means is located at the radially outward edges of said conductive disks and said first and second contact means contact said first and second conductive disks near the center of the respective conductive disk.

12. The machine of claim 11, wherein said first and second contact means each comprise a carbon brush.

13. The machine of claim 2, further comprising:

a third and fourth magnetic disk, said third magnetic disk centered on and connected to said shaft and disposed between said barrier means and said first conductive disk, said fourth magnetic disk centered on said shaft and disposed between said barrier means and said second conductive disk, the magnetic field generated by said third magnetic disk aligned with the magnetic field of said first magnetic disk, and the magnetic field of said fourth magnetic disk aligned with the magnetic field of said second magnetic field.

* * * * *

UNITED STATES PATENT AND TRADEMARK OFFICE
CERTIFICATE OF CORRECTION

PATENT NO. : 5,451,825

DATED : September 19, 1995

INVENTOR(S) : Bryan W. Strohm

It is certified that error appears in the above-identified patent and that said Letters Patent is hereby corrected as shown below:

Claim 11, column 12, line 62, delete "interconnected", and insert -- interconnecting --.

Signed and Sealed this

Nineteenth Day of March, 1996

Attest:

BRUCE LEHMAN

Attesting Officer

Commissioner of Patents and Trademarks